INVENTOR
HAROLD RUSCHER
BY Frank M. Murphy
ATTORNEY.

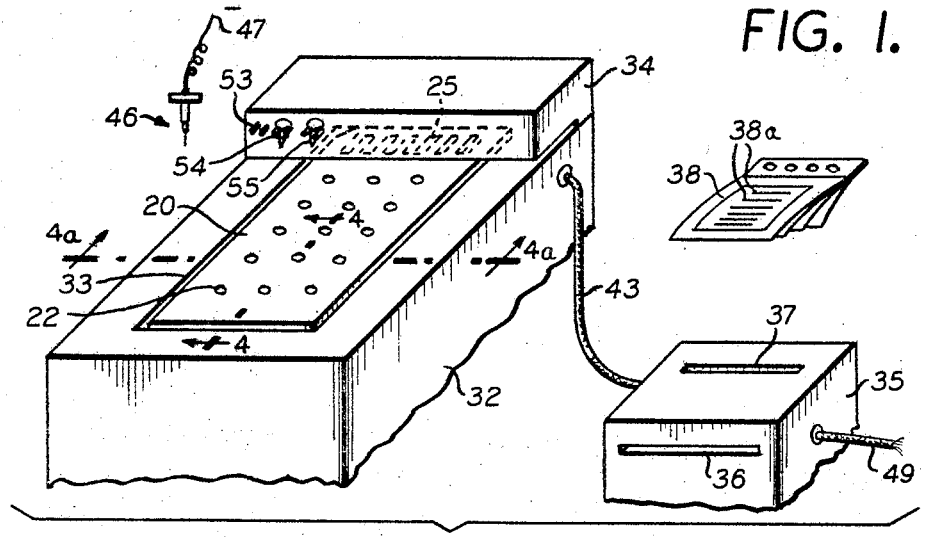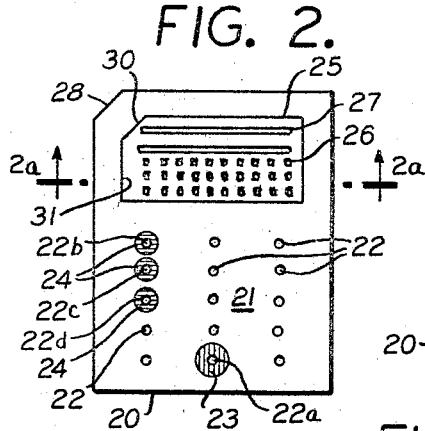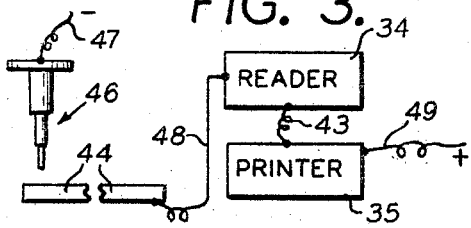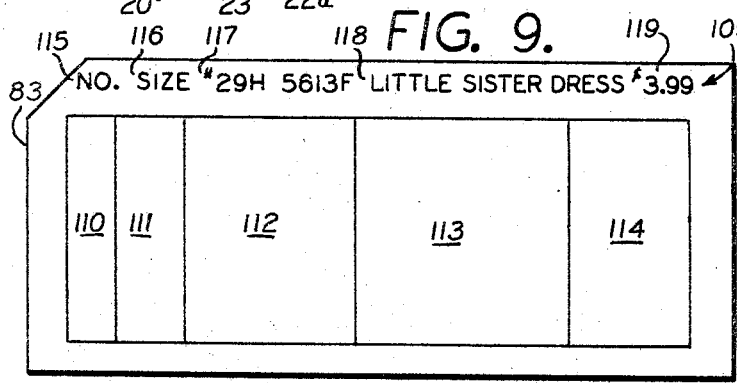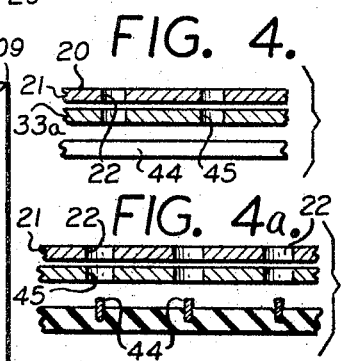

United States Patent Office 3,427,440
Patented Feb. 11, 1969

3,427,440
PRINTING OF ORDER FORMS AND
INVENTORY CONTROL
Harold Ruscher, Bedford Village, N.Y., assignor of one-fourth to Dorothy Ruscher, and one-half to Harold Ruscher, Jr., Westchester, N.Y.
Filed Aug. 12, 1964, Ser. No. 389,096
U.S. Cl. 235—61.9          13 Claims
Int. Cl. G06k 3/02, 17/00

ABSTRACT OF THE DISCLOSURE

System for issuing forms bearing information with respect to goods to be withdrawn from a stock thereof and concurrently maintaining a stock inventory for the stock balance. An inventory chart is marked to provide a visual indication of a withdrawal and a visual indication of the balance of goods in stock. This marking serves to actuate a reader which reads from an information card provided for utilization with the inventory card, information applicable to the goods the inventory card represents. The reader transmits the information to a printer, and the printer prints and issues a form or forms which can be used as invoices, etc.

---

This invention relates to a system for printing order forms and at the same time providing a record of inventory.

A substantial portion of the cost involved in operating a warehouse is due to the cost for paper work necessary to the filling of orders, and to the cost of maintaining a record of inventory. It is a principal objective of the present invention to provide an efficient system for accomplishing these tasks.

The manner in which this object and still other objects are obtained, will be apparent from the following description, taken in reference to the accompanying drawings wherein:

FIG. 1 is a perspective view of apparatus for use in practicing the system of the invention;

FIG. 2 is a plan view of a combined inventory chart and goods information card;

FIG. 2a is a cross-section taken on line 2a—2a in FIG. 2;

FIG. 3 is a schematic wiring diagram for the apparatus shown in FIG. 1;

FIG. 4 is a cross-sectional view taken along line 4—4 in FIG. 1;

FIG. 4a is a cross-section taken on line 4a—4a in FIG. 1;

Figure 5:
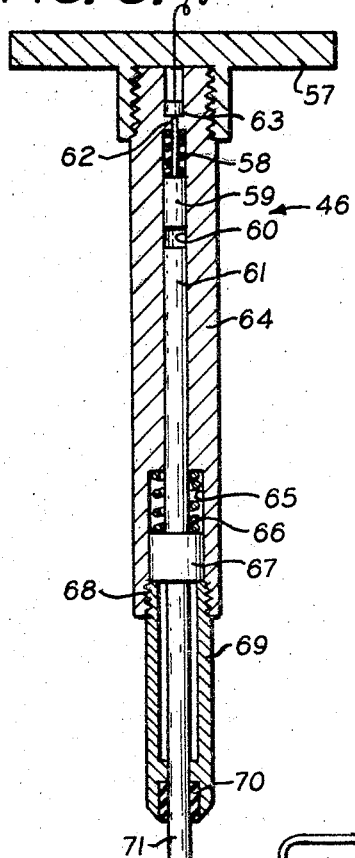
Figure 6:
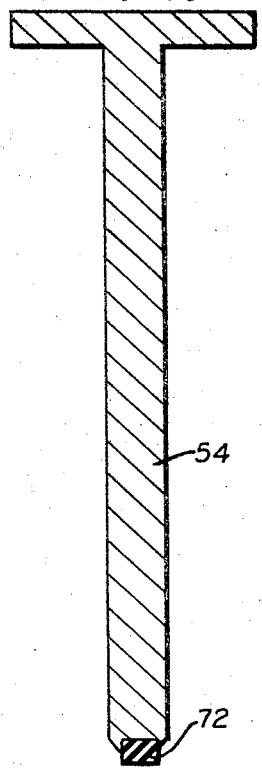
Figure 7:
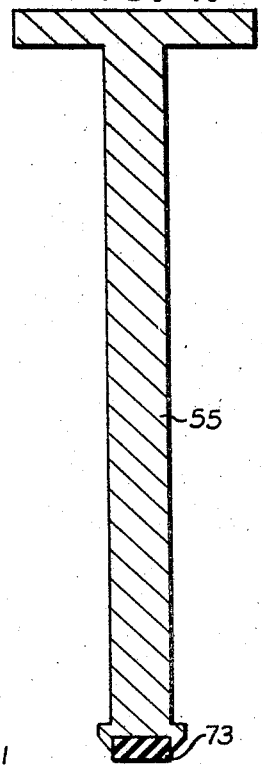
Figure 8:
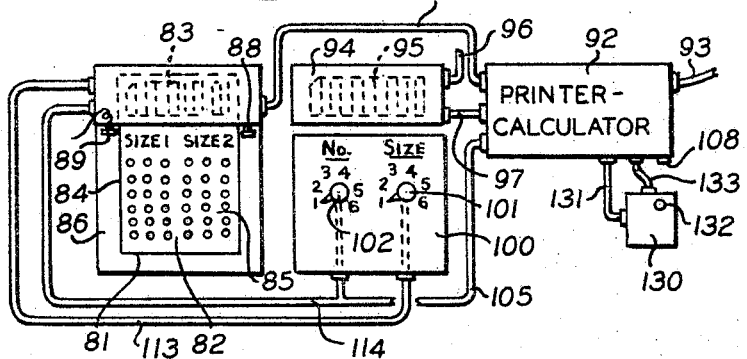

FIG. 5, FIG. 6, and FIG. 7 are plan views in cross-section of stylus instruments for use with the apparatus employed in the system of the invention;

FIG. 8 is a plan view of an alternative form of apparatus for practice of the system of the invention;

FIG. 9 is a schematic showing of a goods information card;

FIG. 10 is a schematic showing of a portion of a customer information card; and

Figure 11:
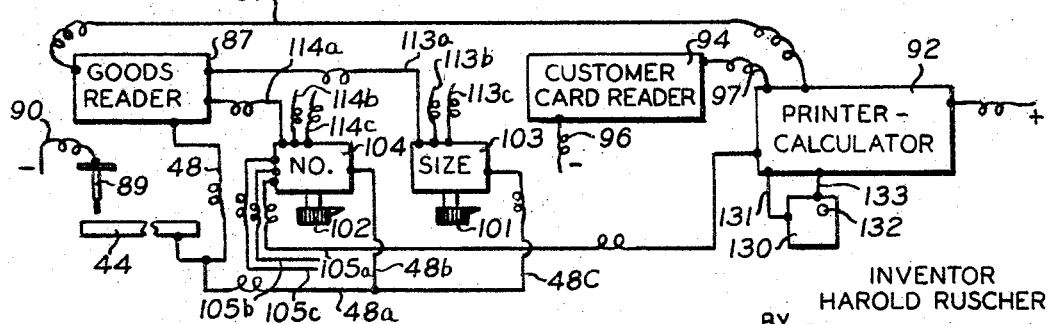

FIG. 11 is a schematic wiring diagram for the apparatus shown in FIGURE 8.

According to the invention, a system is provided for issuing forms bearing information with respect to goods to be withdrawn from a stock thereof, and concurrently maintaining a stock inventory for the stock balance following the withdrawal of goods for which the forms are issued.

The equipment utilized for practice of the system according to the invention can include an inventory chart which represents at least one specific kind of goods in stock, and is adapted for receiving marks to indicate goods withdrawals so that for the goods which the chart represents, or for each kind of goods which the chart represents, the chart provides a visual indication of the number of the items withdrawn from stock. Provision is further made for providing on the chart a visual indication of the total number of items in stock prior to any withdrawals, and so by observation of the chart, the number of items remaining in stock at any given time can be determined. The system also utilizes information cards. There can be an information card for each inventory chart, and such information card is coded with information applying to all the goods to which the inventory chart applies. Thus, if the inventory chart applies to one specific kind of goods, such as a particular dress style of a particular size, color, etc., the information cards can be coded with all such information.

A printer is used for issuing forms containing information coded on the information cards. The forms can include an invoice, packing slip, warehouse routing slip, etc. For the production of the printed form, data processing means are employed. The data processing means is provided for receiving the information card and the inventory card and includes sensing means for reading the information coded on the information card, and transmitting means for transmitting such information to the printer for actuation of the printer for issuance of the forms. The data processing means further includes marking means for marking the inventory chart to indicate goods withdrawals. Control means are provided for actuation of the sensing means in correspondence with operation of the marking means. Thus, upon marking the chart to indicate a goods withdrawal, the sensing means can be actuated to effect a reading of the information card and, in turn, actuation of the printer for issuing the forms. Thus, the printer is caused to operate in correspondence with the markings of the inventory chart.

Referring to the drawings, in particular FIG. 1–FIG. 7, a stock chart is shown in FIG. 2, and this chart includes an inventory area 21 and an information card 25. Referring to FIG. 1, a printer is indicated by the reference character 35, and means for data processing are indicated by the reference numeral 32. The business form 38 is produced by a printer 35.

In more detail the stock card 20 (FIG. 2) includes an inventory area 21 and an information card 25. The inventory area includes a plurality of perforations 22 which are disposed in a uniform array. This inventory area applies to specific goods, such as a dress of particular size, color, etc., and each of the perforations 22 represents a unit of the goods, such as a single dress or a dozen dresses. In the embodiment illustrated, the perforations are arranged in three vertical rows, and there are five perforations per row. The upper perforation 22b can be assigned number 1, and the perforation immediately below it, perforation 22c, can be assigned number 2, and so on down the first or left-hand row and on down the second and then the third row. Thus, the bottom perforation in the second or middle row represents 10 units. The perforation corresponding to the number of units of the goods initially in stock is marked in a suitable manner, such as by marking the area adjacent the perforation with a red ring 23. Withdrawals are indicated by marking an unmarked perforation for each withdrawal, and, preferably, the perforations are marked in succession, starting with the first perforation in the left-hand corner. A blue color can be used for such marking. Thus, the perforations 22b, 22c, and 22d are each marked with a blue ring 24 to indicate that three units have been withdrawn. The balance remaining in stock, i.e., the inventory, can then be taken by noting that whereas 10 units were initially in stock, three have been withdrawn, so that the inventory is 7 units.

The information card 25 can be a so-called tabulating card or punch card, which is coded with information applying to the particular goods which the inventory area 21 represents. Thus, the information card 25 includes perforations 26 which code the card with information as to size, stock number, name of the article, price, etc. For convenient reference, the same information in printed form is set forth in the area 27 of the information card.

In the embodiment illustrated, the inventory area 21 and the information card 25 are combined as a unitary stock card. The stock card includes an opening 31 which receives the information card 25. The information card can be secured in place by any suitable means, such as by tape 29, see FIG. 2a. Thus, the information card is detachable with respect to the stock card and can therefore be used with a series of cards or charts including an inventory area. Providing a stock card in the manner that the inventory area and the information card or area detachably connected together is desirable since in use, a given information card may have application to a series of inventory areas, used at different times. The stock card is provided with a clipped corner 28 corresponding with the clipped corner 30 on the information card, and serves the known function for such a card corner, namely, to coordinate a data processing means used in connection with the card, and the utilization of the card.

The data processing function utilized in the system of the intvention, is performed by the device 32, which includes a stock chart support 33 for receiving the stock chart 20, to provide the inventory area 21 exposed for use. The construction of the device 32 beneath the stock chart 20 can be best seen in FIG. 4. Thus, the wall 33a of the device 32 is provided with perforations 45 which are aligned with perforations 22 in the inventory area of the stock card 20, when the stock card is positioned for use on the device 32. Below the wall 33a and aligned with each row of perforations 45, is a solid conductor bar 44. As will be described in more detail hereinafter, in utilization of the inventory area, electrical connection is made with the conductor bar 44 by insertion of a stylus, such as stylus 46, shown in FIG. 1, through aligned perforations in the stock card and the upper wall 33 of the device 32.

The device 32 further includes sensing means for reading information coded on the information card 25. Thus, the device includes the reader 34. The reader 34 can be of known construction. It is positioned so that it overlies the information card 25 when the stock card 20 is in place on the device 32 in the support 33 therefor. See FIG. 1.

In the operation of the system of the invention, the information coded on the card 25 is read by the reader 34 and is transmitted through electrical connection 43 to the printer 35. The printer 35 has an inlet 36 for insertion of a suitable form, and an outlet 37 for delivery of the printed form. A delivered printed form, including several copies, is represented by the reference character 38. See FIG. 1.

A schematic wiring diagram for the system shown in FIG. 1, is set forth in FIG. 3. The stylus 46 is connected to a source of electrical power by line 47, and, as mentioned above, can be used to make contact with the conductor bar 44, whereby the conductor bar 44 is connected to the source of electrical power. Conductor bar 44 is connected with reader 34 by the conductor 48, and the reader in turn is connected with the printer 35 by conductor 43. The printer 35 is connected with the power supply source by the conductor 49. Thus, it will be observed, that the circuit through the printer 35 and the reader 34 can be closed by utilization of the stylus 46. With a stock chart suitably positioned on the device 32, upon closing the circuit with the stylus 46, the reader 34 will read information on the information card 25 and transmit such information to the printer 35, and the printer will print the information on the form. The printer 35 can be of known construction.

Thus, the reader includes sensing means for picking up information coded on the card, and transmitting means for transmitting such information to the printer for actuation of the printer for issuing the forms. Further, marking means are provided for marking the inventory area to indicate goods withdrawal. As is described in more detail hereinafter, the stylus 46 is outfitted with marking means, so that upon insertion of the stylus through a perforation 22 of the inventory area and on through a corresponding perforation 45 of the upper wall 33a of the data processing device, and on to contact with the conductor bar 44, the inventory area is marked in the vicinity of the perforation through which the stylus is inserted. Control of the data procesing means is effected by utilization of the stylus 46, the conductor bar 44, and the conductor 48, as is described above, to actuate the sensing means to, in turn, actuate the printer for issuing of the forms, and, with marking means as described, corresponding marking of the inventory area is effected to indicate withdrawal in accordance with the printing on the form.

The stylus 46 is shown in detail in FIG. 5. It includes a body portion 64 having an axial bore 60 in which there is received an elongated conductor 61. The elongated conductor 61 is axially slidable in the bore 60, and this conductor includes an enlarged portion 67 which is received in recess 65 in the stylus body 64. End piece 69 is threaded onto the body portion 64 and provides a shoulder 68 for arresting downward movement of the conductor 61. A spring 66 is contained in the recess 65 and serves to urge the conductor 61 downwardly so that the enlarged portion 67 is in engagement with the shoulder 68. The conductor 61 extends on through end piece 69 and terminates in a contact end 71 which is disposed outwardly of end piece 69. Between the end piece 69 and the conductor 61 where the conductor emerges from the end piece, is an ink pad 70 which serves as a marker, as is described in more detail hereinafter. The upper portion of the stylus body 64 includes a contact 59 which has an enlarged upper end 63 normally in engagement with shoulder 62 of the body portion 64. A spring 58 is disposed in the bore 60 and urges the contact 59 to a downward position. In the normal condition of the stylus, when not in use, the adjacent ends of contact 59 and conductor 61 are spaced from each other a short distance in the bore 60, as is indicated in FIG. 5. An extendable conductor 47 is in electrical connection with the upper end 63 of the contact 59. The stylus is provided with a T-handle 57, and, when not in use the stylus can be placed on the rest 53 of the device 32 (FIG. 1).

In use, the stylus 46 is manipulated manually to insert the bottom end thereof through the perforation in the inventory area 21, and on through a corresponding perforation in the upper wall 33a of the device 32, and on until the end 71 of the conductor 61 contacts the corresponding conductor bar 44. Following such contacting, the stylus is pressed down whereupon the spring 66 is compressed and the body portion 64 of the stylus moves downwardly with respect to the conductor 61, and the upper end of the conductor 61 makes electrical connection with contact 59. Upon further downward pressure on the stylus, the spring 58 in the upper end of the stylus is compressed and, again, the body portion of the stylus moves downwardly with respect to the conductor 61. Such downward movement continues until the marker 70 makes engagement with the portion of the inventory area surrounding the perforation through which the stylus is inserted. The marker 70 is a pad saturated with an appropriate ink, and ink is transferred to the chart, thus providing an indication of the insertion of the stylus.

Desirably, an auxiliary stylus 54, and an auxiliary stylus 55 are also provided. These stylus instruments are shown in FIG. 1, and are shown in detail in, respectively FIG. 6 and FIG. 7. Neither of the stylus instruments 54 or 55 is electrically energized. The auxiliary stylus 54 is a solid T-shaped stylus having an ink pad 72 positioned on the end thereof. This ink pad is of a diameter corresponding to the outside diameter of the ink pad 70 on the stylus 46 and the ink pad 72 carries ink of a different color from the ink carried by pad 70. The auxiliary stylus 54 can be used to mark over a a mark made with the stylus 46, as may be desirable when, for example, goods withdrawn are returned to the inventory. The auxiliary stylus 55 is a solid T-shaped instrument having ink pad 73 on the end thereof. The ink pad can be used for marking one of the perforations in the inventory area to indicate the total number of goods in stock initially. Desirably, the ink of ink marker 73 is red. The ink carried by marker 70 of the stylus 46 can be blue and the ink of the marker 72 of auxiliary stylus 54 can be yellow or other suitable color which will serve to provide a suitable overprint of the color of the stylus 46, while at the same time being susceptible to suitable overprinting by the marker of the stylus 46 when it is desired to so mark the perforation which has been marked with the auxiliary stylus 54. Thus, a given perforation in the inventory area may be marked to indicate a withdrawal, may thereafter be marked to indicate a return, and, it may be desired to again mark such perforation to indicate a withdrawal. The various inks used should be compatible with such operation.

Whereas, in the embodiment described above, one conductor bar 44 is provided for each row of perforations in the inventory area and in the upper sidewall 33a of the device 32, it will be appreciated that the effect from contacting each of the conductor bars 44 (see FIG. 4a) is the same, and, of course, the effect of contacting any one of the conductor bars 44 from the various perforations with which it is lined is the same. Accordingly, the conductor bars 44 could be replaced by a flat plate which would serve as a conductor. Moreover, it is not necessary that the upper sidewall 33a of the data processing device 32 be perforated, since the electrical circuit requirement could be provided by the upper sidewall itself, so that the desired electrical connection would be made merely by insertion of the stylus through a perforation of the inventory area. Thus, the control means for the data processing device can be made up of a stylus and an electrical supply connection to sensing means for supplying power to the sensing means for operation thereof, arranged to be actuated by insertion of the stylus through a perforation in the inventory area.

In operation, the embodiment described above can be used in the following manner. Upon receipt of an order for goods contained in the warehouse, the warehouse order clerk can select the appropriate stock card for a particular item listed in the order, and can place this stock chart on the data processing device 32 in a predetermined location according to the design of the device 32. The upper left-hand corner of the stock card is clipped as is indicated at 28 in FIG. 2. In known manner, this form characteristic of the stock chart serves to insure correct positioning of the stock card before the device 32 is operated. Thus, sensing means (not shown) are included in the device 32 which are effective to sense the position of the clipped corner 28 when the card is in the proper position on the device 32 and to then render the device operative. Assuming that the order is for one item of the goods in question, and that each perforation in the inventory area 21 represents a single item of goods, the stylus is inserted through the first unmarked perforation so that the end 71 of the stylus conductor 61 contacts the conductor bar 44 underlying the perforation. The stylus is then pushed downwardly until the marker 70 of the stylus engages the surface of the stock chart and prints about the perforation through which the stylus has been inserted a mark serving to indicate withdrawal from stock of one item of the goods which the inventory area represents. The contacting of the conductor bar 44 serves to actuate the reader 34 so that the reader reads information contained on the information card 25. The reader transmits this information through cable 43 to the printer 35, and the printer serves to print on the form 38 the information coded on the information card 25. Such information can include the size, trade name, price, etc. for the goods.

In this illustrated example, the total number of items originally contained in stock is ten and, accordingly, the tenth perforation, perforation 22a, starting from the upper left hand perforation in the inventory area, perforation 22b, and going down the first column, then to the top of the secod column and down the second column, is marked with a red annular ring 23 as can be impressed thereon with the auxiliary stylus 55. Withdrawals are then indicated by, for example, blue rings printed about perforations with the stylus 46. As shown in FIG. 2, three items have been withdrawn and the perforations 22b, 22c, and 22d, are each marked with an annular blue ring 24. Thus, by observation of the chart, it can be readily determined that the balance in stock available for filling orders is seven items.

An increase in stock as may be effected by delivery of goods to the warehouse can be indicated by overprinting the mark 23 at perforation 22a and providing a new mark at an appropriate perforation, corresponding to the inventory increase.

In the embodiment described above, all of the information printed on the form 38 which is produced by the system is derived from the information card 25, and this information is invariable with respect to utilization of one of the perforations 22 in the inventory area 21 of the stock chart 20. The invention further contemplates printing on the form information not derived from the information card 25 which applies for particular goods represented by perforations in the inventory area 21, such as, for example, information applicable to the particular customer placing the order. Thus, the system can include a second the form information not derived from the information tion card having information coded thereon applying to a particular customer. Such second data processing means can include sensing means for reading information coded on the customer information card and transmitting means for transmitting such information to the printer, and the printer can correspondingly include means responsive to the customer information transmitted thereto and effective to print said information on the form. The customer information can include name, address, credit information, etc. The corresponding printing on the form must, of course, be in an appropriate location on the form, and the printer, in known manner, is outfitted for effecting the printing at appropriate areas on the form.

The invention also provides for a variable or variables with respect to a single goods entry on the form. For example, provision can be made for variation in the printing on the form to indicate the number of items ordered, and, further, for indicating the total price for the total number of a given item which is ordered. Other variables are possible. Thus, the stock chart may include a number of inventory areas, one for each of several sizes of a particular item, for example, a dress, and the information coded on the information card of the stock chart would apply to all of the sizes covered by the stock chart. Means would then be provided for printing on the form values or any variables as among the various sizes covered by the inventory areas, foremost among which, of course, is the size itself. Thus, the system can include a selector for selection of a value for an entry on the form which does not have a counterpart on the information card of the stock chart. The selector includes means for actuation thereof to select the value and is operatively connected to the printer, and the printer includes means responsive to the selector for entering on the form the value controlled by the selector.

Where the system includes a selector for indicating the number of items ordered corresponding to a single entry on the order form, the system desirably includes means for entering the total cost for such number of items. The information card of the stock chart can include as coded information the price for each of the items, and the data processing means can serve to transmit to the printer information as to the price per item. A selector will be provided for transmitting to the printer information as to the number of items ordered and the printer will be outfitted to translate such information to printing on the form. The printer can further include a calculator for correlating the information as to price per item received from the data processing device, and information as to the number of items received from the selector, and for printing on the form the price for the total number of items for the entry in question.

An embodiment of the invention including means for providing on the form information as to the particular customer placing the order, and further including selector mean for selection of the number of items and size, and also including a calculator for indicating the total price for all items covered by a given entry on the order form, is illustrated in FIG. 8–FIG. 11. In this embodiment, with respect to the embodiment illustrated in FIG. 1–FIG. 7, like reference characters indicate corresponding parts.

The stock chart 81 includes an inventory area 82, and the information card 83. The inventory area 82 is provided with two groups 84, 85 of perforations, each group being disposed in uniform array and representing a particular size for the goods to which the stock chart applies. Thus, the perforations in the area indicated by the reference 84 are for size 1 of the goods in question, while the perforations in the area indicated by the reference character 85 are for size 2 of the goods in question. The information card 83 is coded with information applicable to both the size 1 and the size 2 goods. To utilize the chart 81, it is placed in a predetermined location on the data processor 86, with the information card 83 below the reader 87 of the data processor. A stylus 89 connected to power supply via conductor 90, is provided, and can be operated in the manner in which the stylus 46 of the embodiment of FIG. 1 is operated, both marked the inventory area 82 appropriately and to actuate the reader 87. The data processor is provided with control means for cooperation with the stylus 89 to control the operation of the reader 87, in the manner in which the embodiment of FIG. 1 is provided with control means for a like function. The reader 87 is connected with the printer-calculator 92 by cable 91.

The system further includes a second reader 94 which is provided for reading customer cards 95. As is indicated at 98 in FIG. 10, the customer card is provided with information applicable to a particular customer, such as name, address, and coded information relating to credit. The reader 94 is effective to pick up the information contained on the customer card and to transmit it through cable 97 to the printer-calculator 92.

This embodiment provides for variation, with respect to a particular stock chart, of both number of items ordered, and size of the items. Thus, the system includes a selector 100 having a size selector 101 and a quantity selector 102. The size selector 101 is connected with the reader 87 via cable 113, and the quantity selector 102 is connected with the reader 87 by the cable 114, and is also connected with the printer-calculator 92 by the cable 105.

As is indicated in FIG. 9, the information card includes areas 110, 111, 112, 113, and 114, for, respectively, the quantity of items, the size, the stock number (indicated by the reference number 117), the trade name, which, for dress goods, could be the trade name indicated by the reference numeral 118, and the price per unit, which in the embodiment illustrated is $3.99. Since, in the embodiment here considered, the quantity and the size are variables with respect to the stock chart 81, the areas 110 and 111 will contain no information. The other areas, namely 112, 113, and 114, will be coded in an appropriate manner. Information as to stock number, trade name, and price, will be obtained from the information card 83, whereas the information as to quantity and size will be determined by operation of the select or 100.

In operation, the order clerk, upon receiving an order for goods, will obtain the record customer card for the customer placing the order, and will clip this customer card to the order and forward the papers to the inventory clerk. The inventory clerk will select stock cards corresponding to the items ordered. He will then place the customer card 83 in the customer card reader 94. This reader operates in a known manner and senses information contained on the customer card and transmits this information through cable 97 to the printer-calculator 92, which prints the information as to the customer on the form. The customer card can now be removed from the reader and returned to the file. The inventory clerk then places one of the stock charts on the data processor 87. He then manipulates the selector knob 102 of the quantity unit 104 (see FIG. 11) according to the number of the items ordered, and in like manner manipulates the selector knob 101 of the size selector unit 103, according to the size ordered. The stylus 89 can then be utilized in a manner as is described for the stylus 46 in the embodiment of FIG. 1, to energize the conductor bar 44 (FIG. 11). This will serve to energize the reader 87 through the line 48 for reading of information as is coded on the card 83. Further, the line 48 is connected to the quantity selector 104 and the size selector 103 via lines 48a, 48b, and 48c, and energizing of the conductor bar 44 serves to energize the selector units 104 and 103 referring to the quantity selector unit 104, as is shown in FIG. 8, a cable 114 including a plurality of individual conductors, for example, conductors 114a, 114b, and 114c (see FIG. 11) interconnects the quantity selector with the reader 87. The individual conductors of the cable 114 are connected within the reader 87 in a manner to by pass the scanner for the area of the information card 83 provided for quantity, namely area 110, and to provide the reader with a signal to initiate the appropriate transmission, for quantity, from the reader 87 to the printer-calculator 92. The circuitry within the reader 87 for performing this function, is not illustrated, since it is known and forms no part of the present invention. There is an individual conductor such as conductors 114a, 114b, and 114c, within the cable 114, for each quantity which can be selected with the quantity selector knob 102, and the conductor for the quantity selected with the quantity selector knob 102, by such selection, is placed in electrical connection with the reader 87. Energizing of the conductor bar 44 with the stylus 89 serves to energize the by pass in the reader 87 corresponding to the number selected, via the circuit including conductor 48a, 48b, the selector unit 104, and the appropriate individual conductor in the cable 114. In a similar manner, the size selector 103 is connected with the reader 87 by a cable 113, which includes a plurality of individual conductors, including conductors 113a, 113b, 113c, and these conductors are connected in a suitable by pass in the reader 87 so as to provide the transmission as to size, to the printer-calculator 92. In the case of the size selector, energizing of the conductor bar 44 serves to energize the size by pass in the reader 87 through a circuit including conductor 48a, 48c, the size selector 103, and the individual conductor of the cable 113 corresponding to the size selected with the size selector knob 101.

Thus, operation of the stylus 89 is effective to cause transmission to the printer-calculator of information read from the information card 83 by the reader 87, and, further, information as to number and size provided by operation of the selector 100.

The system further includes means for entering on the form the total cost for the total number of a given item entered on the form. In the embodiment illustrated, the price per item as is indicated at 119 in FIG. 9, is $3.99. This information is picked up by the reader 87 and transmitted to the printer and, accordingly, it is printed on the form. Further, the quantity unit 104 is connected to the calculator element of the calculator-printer 92 via cable 105 which includes a plurality of individual conductors, such as conductors 105a, 105b, and 105c (see FIG. 11). There is one individual conductor for each quantity as may be selected by the quantity selector unit 104. Upon the selector unit 104 being energized in the manner described above, a signal is transmitted through cable 105 to the calculator unit of the printer-calculator 92, and the appropriate calculation is effected to provide the total price for the number of items, and this total price is printed on the form. The calculator element of the printer-calculator 92 is not illustrated in detail, since the same can be of known construction and such construction forms no part of the present invention.

In respect to the embodiment of FIG. 8, it should be noted that insofar as the operation of the reader 87 is concerned, it makes no difference whether the stylus 89 is inserted through a perforation for size 1 or a perforation for size 2. It is necessary, however, in order to maintain an accurate record of inventory to utilize the correct perforations. Further, where more than one of an item is ordered, provision should be made for effecting marking of the inventory area in a manner appropriate to indicate the corresponding reduction in inventory. Thus, where two size 1 items are ordered, but one of the perforations for size 1 will be marked upon actuation of the system to effect the appropriate entry on the form, whereas in order to indicate the proper inventory, two of the perforations should be marked. The second mark can be provided with an auxiliary stylus 88 which is of a construction indicated in FIG. 6 and is not energized, but merely includes means for effecting appropriate marking.

The invention contemplates the making of a plurality of entries on the form, one entry being for each specific kind of goods. Thus, there can be an entry on any number of the lines 38a on the form 38 (FIG. 1). Utilizing a printer-calculator 92 (FIG. 11) as is described above, the total price for the items covered by each entry can be printed on the form. Further, the system can include a price totalizer for totalizing prices for all of the entries and the printer can include means for response to the totalizer to print the total price for all of the entries. The totalizer is selectively actuatable to in turn actuate the printer for the printing of the total price.

Referring to FIGS. 8 and 11, as described above, the printer-calculator 92 calculates the total cost for the goods of each entry on the form and prints such totals on the form. The information as to the total cost for each entry is also transmitted to the totalizer 130 via line 131. The totalizer 130 can be any suitable calculator and includes the add-button 132, which upon being depressed serves to actuate the totalizer to determine the total of the amounts received corresponding to the individual entries on the form. This information is transmitted to the printer-calculator 92 via line 133 and the printer-calculator prints on the form the total for all entries.

While the invention has been described with respect to particular embodiments thereof, these embodiments are merely representative and do not serve to set forth the limits of the invention.

What is claimed is:

1. System for issuing forms bearing information with respect to goods to be withdrawn from a stock thereof and concurrently maintaining a stock inventory for stock balance following withdrawal of goods for which such forms are issued, which comprises:
    (a) an inventory chart for at least one specific kind of goods in stock and for receiving marks to indicate goods withdrawals of each specific kind of goods to which the chart applies,
    (b) an information card coded with information applying to goods to which the inventory chart applies,
    (c) a printer for issuing the forms with the information coded on the information card, printed thereon,
    (d) data processing means for receiving the information card and the inventory chart and including
        (1) sensing means for reading the information coded on the information card, and transmitting such information to the printer for actuation of the printer for issuing forms as aforesaid,
        (2) at separate implement having marking and actuating means for marking the inventory chart to indicate goods withdrawals and actuating the system,
        (3) control means responsive to the marking and actuating means to actuate the sensing means in correspondence with operation of the marking means to, in turn, actuate the printer for issuing the forms, in correspondence with marking of the inventory chart to indicate withdrawal.

2. System according to claim 1, the data processing means including an inventory chart support for receiving the inventory chart, the inventory chart having a plurality of perforations representing a specific kind of goods in stock, each said chart perforation representing a unit of the specific goods, said control means including a stylus and an electrical power supply connection to the sensing means for supplying power thereto for the operation thereof and arranged to be actuated by insertion of the stylus through a chart perforation, said marking means comprising a marker device mounted on said stylus for marking the inventory chart adjacent a chart perforation through which the stylus is inserted for actuation of the power supply means.

3. System according to claim 1, the data processing means including an inventory chart support for receiving the inventory chart in a predetermined location thereon, the inventory chart having a plurality of perforations representing a specific kind of goods in stock, each said chart perforation representing a unit of the specific goods, the said inventory chart support having perforations aligned with said chart perforations when the chart is mounted on the support in said predetermined location, said control means including a stylus and an electrical power supply connection to the sensing means for supplying power thereto for the operation thereof and arranged to be actuated by insertion of the stylus through aligned perforations of the chart and support, said marking means comprising a marker device mounted on said stylus for marking the inventory chart adjacent a chart perforation through which the stylus is inserted for actuation of the power supply means.

4. System according to claim 3, the stylus and said power supply connection being elements of an electrical circuit closable by insertion of the stylus through said perforation as aforesaid.

5. System according to claim 1, said inventory chart and information card being joined together for delivery as a unit to the data processing means.

6. System according to claim 4, said inventory chart and information card being joined together for delivery as a unit to the data processing means.

7. System according to claim 1, and including a selector for selection of a value for an entry on the form without any counterpart on the information card, said selector including means for actuation thereof to select the value and being operatively connected to the printer, the printer including means responsive to the selector for entering on the form the value controlled by the selector.

8. System according to claim 7, the information card including as coded information the price for each of said specific kind of goods, the data processing means transmitting said price information to the printer employing the sensing means as aforesaid, said printer including a calculator responsive to price information received from the data processing means and to the number of items information received from the selector, and effective to enter on the form the total price for the number of the specific kind of goods.

9. System according to claim 1, and including second data processing means, said second means being for receiving a customer information card having information coded thereon, and including sensing means for reading information coded on the customer information card and transmitting such information to the printer, said printer including means responsive to the customer information transmitted thereto and effective to print said information on the form.

10. System according to claim 7, and including second data processing means, said second means being for receiving a customer information card having information coded thereon, and including sensing means for reading information coded on the customer information card and transmitting such information to the printer, said printer including means responsive to the customer information transmitted thereto and effective to print said information on the form.

11. System for issuing forms bearing a plurality of entries, one for each specific kind of goods to be withdrawn from a stock thereof and concurrently maintaining a stock inventory for stock balance following withdrawal of goods for which such forms are issued, which comprises:
  (a) inventory charts, each being for at least one specific kind of goods in stock and for receiving marks to indicate goods withdrawals of each specific kind of goods to which the chart applies,
  (b) an information card for each inventory chart coded with information applying to goods to which its inventory chart applies, including price information,
  (c) a printer for issuing the forms with the information coded on the information cards printed thereon, with an entry on said form for each specific kind of goods to be withdrawn from stock and the corresponding price, and with the total price for all entries on the form,
  (d) a price totalizer for totalizing prices for all entries on the form and selectively actuably to in turn actuate the printer to print on the form the total price for all entries on the form,
  (e) data processing means for receiving the information cards and the inventory charts and including
    (1) sensing means for reading the information coded on the information cards and transmitting such information to the printer for the printing thereon of corresponding entries for the issuing of the forms,
    (2) a separate implement having marking and actuating means for marking the inventory charts to indicate goods withdrawals and actuating the system,
    (3) control means responsive to the marking and actuating means to actuate the sensing means in correspondence with operation of the marking means to, in turn, actuate the printer for printing the forms, in correspondence with marking of the inventory charts to indicate withdrawal.

12. System according to claim 11, and including a selector for selection of the number of items of said specific kind of goods for each entry on the form, said selector including means for manual actuation thereof to select the number and being operatively connected to the printer, the printer including means responsive to the selector and effective to print for each entry on the form the number selected with the selector, the information card including as coded information the price for each of said specific kind of goods, the data processing means transmitting said price information to the printer employing the sensing means as aforesaid, said printer including a calculator responsive to price information received from the data processing means and to the number of items information received from the selector, and effective to print for each entry on the form the total price for the number of the specific kind of goods.

13. System for issuing forms bearing information with respect to goods to be withdrawn from a stock thereof and concurrently maintaining a stock inventory for stock balance following withdrawal of goods for which such forms are issued, which comprises:
  (a) means for receiving an inventory chart for at least one specific kind of goods in stock and for receiving marks to indicate goods withdrawals of each specific kind of goods to which the chart applies,
  (b) means for receiving an information card coded with information applying to goods to which the inventory chart applies,
  (c) a printer for issuing the forms with the information coded on the information card, printed thereon,
  (d) data processing means for the information card and the inventory chart and including
    (1) sensing means for reading the information coded on the information card, and transmitting such information to the printer for actuation of the printer for issuing forms as aforesaid,
    (2) a separate implement having marking and actuating means for marking the inventory chart to indicate goods withdrawals and actuating the system,
    (3) control means responsive to the marking and actuating means to actuate the sensing means in correspondence with operation of the marking means to, in turn, actuate the printer for issuing the forms, in correspondence with marking of the inventory chart to indicate withdrawal.

References Cited

UNITED STATES PATENTS

| | | | |
|---|---|---|---|
| 2,407,196 | 9/1946 | Watson | 235—61.9 |
| 3,002,181 | 9/1961 | Parsons et al. | 235—61.11 |
| 3,017,082 | 1/1962 | Riddiford et al. | 235—61.11 |

FOREIGN PATENTS

| | | |
|---|---|---|
| 1,004,520 | 9/1965 | Great Britain. |

MAYNARD R. WILBUR, *Primary Examiner.*

S. SHEINBEIN, *Assistant Examiner.*

UNITED STATES PATENT OFFICE
CERTIFICATE OF CORRECTION

Patent No. 3,427,440　　　　　　　　　　　　　　February 11, 1969

Harold Ruscher

It is certified that error appears in the above identified patent and that said Letters Patent are hereby corrected as shown below:

Column 2, line 38, "markings" should read -- marking --. Column 5, line 6, cancel "a". Column 6, line 37, "the form information not derived from the" should read -- data processin means for receiving a customer --. Column 8, line 2, "select o should read -- selector --; line 29, "103 referring" should rea -- 103. Referring --. Column 10, line 7, "at" should read -- --.

Signed and sealed this 7th day of April 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents